(12) United States Patent
Oaten et al.

(10) Patent No.: US 9,182,136 B2
(45) Date of Patent: Nov. 10, 2015

(54) HEATING AND COOLING SYSTEM

(75) Inventors: Terrence Oaten, Melbourne (AU); Tilo Schmidt, Healesville (AU)

(73) Assignee: TO IP HOLDING COMPANY PTY LTD, St. Kilda, Victoria (AU)

( * ) Notice: Subject to any disclaimer, the term of this patent is extended or adjusted under 35 U.S.C. 154(b) by 1293 days.

(21) Appl. No.: 12/517,250

(22) PCT Filed: Dec. 11, 2007

(86) PCT No.: PCT/AU2007/001907
§ 371 (c)(1),
(2), (4) Date: Sep. 9, 2009

(87) PCT Pub. No.: WO2008/070907
PCT Pub. Date: Jun. 19, 2008

(65) Prior Publication Data
US 2010/0065040 A1    Mar. 18, 2010

(30) Foreign Application Priority Data

Dec. 11, 2006   (AU) ................................ 2006906905

(51) Int. Cl.
*F24F 7/02*        (2006.01)
*F24F 7/06*        (2006.01)
*E04B 7/00*        (2006.01)
*F24F 5/00*        (2006.01)
(Continued)

(52) U.S. Cl.
CPC .............. *F24F 5/0046* (2013.01); *F24D 5/005* (2013.01); *F24D 5/02* (2013.01); *F24D 19/109* (2013.01); *F24F 7/025* (2013.01); *F24J 2/045* (2013.01); *F24J 2/42* (2013.01); *F24D 12/02* (2013.01); *F24F 2005/0064* (2013.01); *Y02B 10/20* (2013.01); *Y02B 10/24* (2013.01); *Y02B 10/70* (2013.01); *Y02B 30/14* (2013.01); *Y02E 10/44* (2013.01)

(58) Field of Classification Search
USPC ..................................... 454/365, 228; 52/199
IPC ... F24F 5/0046,7/025, 2005/0064; F24D 5/005, F24D 5/02, 19/109; F24J 2/42
See application file for complete search history.

(56) References Cited

U.S. PATENT DOCUMENTS

| 4,034,912 A |   | 7/1977  | Hayes |   |
|---|---|---|---|---|
| 4,102,327 A |   | 7/1978  | Thomason |   |
| 4,437,511 A |   | 3/1984  | Sheridan |   |
| 6,491,579 B1 | * | 12/2002 | O'Hagin | ........................ 454/250 |

(Continued)

FOREIGN PATENT DOCUMENTS

| DE | 10029654 A | 12/2001 |
| FR | 2388223 A  | 11/1978 |
| WO | 96/25632 A | 8/1996  |

OTHER PUBLICATIONS

International Search Report for PCT/AU2007/001907 dated Feb. 6, 2008.

*Primary Examiner* — Steven B McAllister
*Assistant Examiner* — Helena Kosanovic
(74) *Attorney, Agent, or Firm* — Heslin Rothenberg Farley & Mesiti P.C.

(57) ABSTRACT

An integrated heating and cooling system for a living space of a building connects together (a) a solar-based heating and cooling system and (b) heating and cooling systems that rely directly or indirectly on fossil fuels that are conventionally used in buildings. The system operates the solar-based heating and cooling system preferentially to heat or cool the living space. Therefore, the system minimizes the use of fossil fuels to heat and cool the living space.

18 Claims, 5 Drawing Sheets

(51) Int. Cl.
*F24D 5/00* (2006.01)
*F24D 5/02* (2006.01)
*F24D 19/10* (2006.01)
*F24J 2/04* (2006.01)
*F24J 2/42* (2006.01)
*F24D 12/02* (2006.01)

(56) References Cited

U.S. PATENT DOCUMENTS 6,789,618 B2 * 9/2004 Pearson ............ 165/210
6,842,718 B2 * 1/2005 Byrd et al. ............ 702/182
2003/0000213 A1 * 1/2003 Christensen et al. ......... 60/670

* cited by examiner

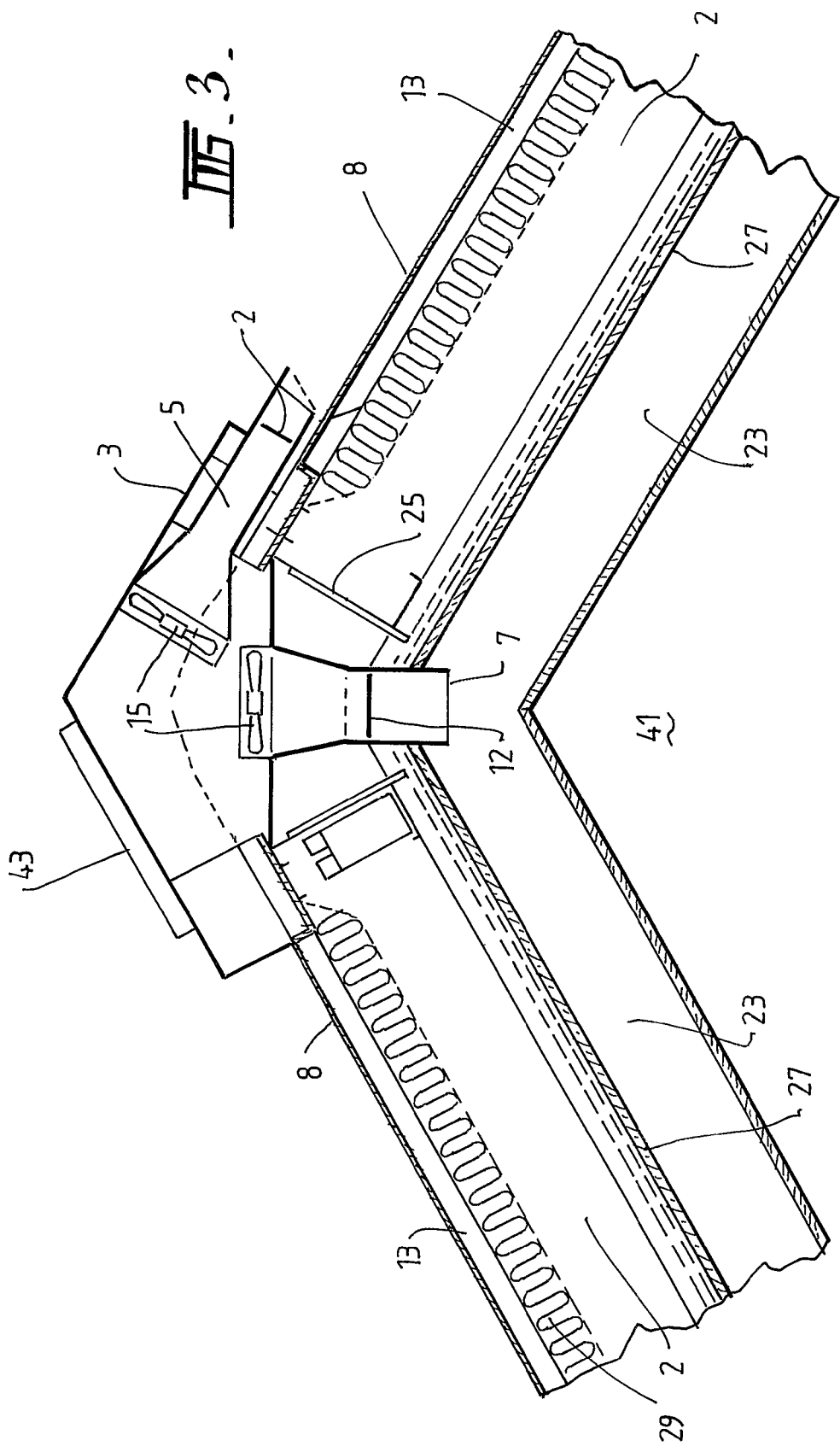

HEATING AND COOLING SYSTEM

CROSS REFERENCE TO RELATED APPLICATIONS

This application is a national stage filing under section 371 of International Application No. PCT/AU2007/001907, filed on Dec. 11, 2007, and published in English on Jun. 19, 2008, as WO 2008/070907, and which claims priority of Australian Patent Application No. 2006906905, filed on Dec. 11, 2006, the entire disclosure of these applications being hereby incorporated herein by reference.

BACKGROUND ART

The present invention relates to a heating and cooling system for a living space of a building.

The nature of heat loss and heat gain within buildings and, more particularly, living spaces of buildings is a complex relationship that is dependent on a number of factors including, by way of example, orientation of buildings, climatic conditions, building materials, building design, ventilation, and internal loads on buildings.

There is an increasing recognition that the use of heated and cooled air pumped into living spaces of buildings to artificially heat and cool buildings is costly in terms of capital and operating costs and is an environmental issue in terms of the use of fossil fuels.

Coincidentally, there is increasing interest in minimising the artificial heating and cooling requirements for the living spaces of new and existing buildings.

The present invention was made during the course of further research and development work in relation to an invention of a system for heating and cooling living spaces of buildings that is described and claimed in International application PCT/AU2006/000146 in the name of the applicant. The specification of the International application is incorporated herein by cross-reference.

The invention of the heating and cooling system in the International application is described and claimed as a roof assembly that includes a roof, a roof space in heat exchange relationship with at least a section of the roof, one or more than one first opening for airflow from the roof space to outside the building altogether to cool the building in "summer" conditions, and one or more than one second opening for airflow from the roof space to a living space of the building to heat the living space in "winter" conditions. With this arrangement, the roof section or sections are heated as a consequence of exposure to solar energy, air within the roof space is heated by heat exchange with the solar heated roof section or sections, the heated air is pumped from the roof space via the openings and, depending on the conditions in and outside the living space, is either pumped (a) into the living space to heat the living space or (b) from the building to effectively remove heat that would otherwise increase the temperature in the living space.

The term "summer" conditions is understood herein to mean that the temperature outside a building is higher than what would be regarded as a desired temperature in the living space of the building.

The term "winter" conditions is understood herein to mean that the temperature outside a building is lower than what would be regarded as a desired temperature in the living space of the building.

The heating and cooling system in the International application can also operate under "nocturnal" conditions to cool a living space in a building. In this context, the term "nocturnal" conditions is understood to mean that the outside temperature is lower than the inside temperature and the inside temperature is higher than what would be regarded as a desired temperature in the living space of the building. This situation arises particularly where there are significant temperature variations between night time and day time.

As is indicated above, the applicant has carried out further research and development work in relation to the above-described solar-based heating and cooling system, and the present invention relates to an invention that was made during the course of this work.

BRIEF SUMMARY OF INVENTION

The present invention is an integrated heating and cooling system for a living space of a building that connects together (a) a solar-based heating and cooling system such as the above-described system and (b) heating and cooling systems that rely directly or indirectly on fossil fuels that are conventionally used in buildings, and operates the solar-based heating and cooling system preferentially to heat or cool a living space. Therefore, the system minimises the use of fossil fuels to heat and cool living spaces of buildings.

In particular, the present invention provides an integrated heating and cooling system for a living space of a building that can achieve and/or maintain a desired temperature in the living space that includes (a) a solar-based heating and cooling system such as the above-described system, (b) a heating and cooling system that relies directly or indirectly on fossils fuels, and (c) a controller that firstly operates the solar-based heating and cooling system to heat and/or cool the living space and, if required, thereafter operates the fossil fuel-based heating and cooling system to heat and/or cool the living space, to achieve and/or to maintain the temperature in the living space at the desired temperature.

It is implicit in the above paragraph that in any given situation the controller operates the solar-based heating and cooling system to the extent possible to heat and/or cool the living space. For example, in situations where heating of the living space is required, during a night time, the solar-based heating and cooling system will not be able to contribute heat to the living space save for heat stored in the system during the course of the day. In such a situation, the controller operates the fossil fuel-based heating and cooling system to heat the living space to achieve and/or maintain the temperature in the living space at the desired temperature until such time as the solar-based heating and cooling system becomes operational again.

Examples of fossil fuel-based heating and cooling systems include electricity-powered heating and cooling systems where the electricity is generated by fossil fuels and heating systems that burn natural gas.

Preferably the controller monitors temperatures in the living space of the building and, subject to the measured temperatures, firstly operates the solar-based heating and cooling system to heat and/or cool the living space and, if required, thereafter operates the fossil fuel-based heating and cooling system, to heat and/or cool the living space to achieve and/or to maintain the temperature in the living space at the desired temperature.

The term "monitors temperatures in the living space" is understood herein to cover direct and indirect determination of temperature. Specifically, the term covers situations where the monitoring device obtains an indication of a temperature but does not actually calculate and/or display the temperature.

Preferably the controller operates the fossil fuel-based heating and cooling system to heat and/or to cool the living space if the monitored temperatures vary from the desired temperature by a predetermined amount.

Typically, the predetermined temperature variation is 2° C.

Typically, the system includes a plurality of temperature sensors at least in the living space.

Typically, the system includes a plurality of temperature sensors in the living space, externally of the building, and in the solar-based heating and cooling system that monitor temperatures in theses areas and the system.

Typically, the sensors input data into a program of the controller on a continuous or periodic basis and the program processes the data and operates the solar-based heating and cooling system and, if required, the fossil fuel-based heating and cooling system to achieve and/or to maintain the desired temperature in the living space.

Typically, the living space includes a plurality of rooms and there are different desired temperatures for the rooms. For example, in the case of a domestic home, typically the desired temperatures will be different in bedrooms and family rooms. In such a situation, preferably the program is responsive to operate the solar-based heating and cooling system and, if required, the fossil fuel-based heating and cooling system to achieve and/or to maintain the different desired temperatures in different rooms.

Preferably the solar-based heating and cooling system includes a roof assembly as described and claimed in the International application that includes a roof, a roof space in heat exchange relationship with at least a section of the roof, one or more than one first opening for airflow from the roof space to outside the building altogether to cool the building in "summer" conditions, and one or more than one second opening for airflow from the roof space to a living space of the building to heat the living space in "winter" conditions and to cool the living space in "nocturnal" conditions.

Preferably the second opening is adapted to allow airflow from the roof space to the living space in "nocturnal" conditions when the outside air temperature or the roof temperature is lower than the inside temperature and the inside temperature is higher than a desired temperature, for example as may be the case overnight.

Preferably the roof assembly includes a means for causing airflow within the roof space in heat exchange relationship with the roof to the opening or openings.

The above-described roof assembly relies on movement of air within the roof space in heat exchange relationship with the roof section or sections and ultimately from the roof space.

Such movement may be the result of natural upward movement of heated air in the case of an inclined roof.

Preferably the movement in inclined and flat roofs is promoted by the use of a specific means for causing airflow.

Preferably the airflow means includes at least one fan for causing airflow within the roof space to the opening or openings.

Preferably the fan is a solar-powered fan.

The air flow may be derived from air within the roof space and/or from air from the exterior of the building that flows into the roof space, for example from a gutter end of the roof.

The roof section may be made of any currently used roofing materials. These include terra cotta tiles and metal tiles, for example metal ribbed tiles and sheet metal tiles formed by being pressed and include corrugations and/or ribs. Particularly suitable roofing materials include metal sheets that are arranged in side by side, more preferably overlapping, relationship.

Preferably the selected roofing materials are metal sheets formed, for example by being roll-formed, from painted or unpainted steel strip and include profiles that include corrugations or include flat pans separated by ribs.

Preferably the roof section is an inclined roof section and is made from the metal sheets described in the preceding paragraph arranged in side by side, more preferably overlapping, relationship with the corrugations and/or the ribs extending up the inclined surface of the roof section.

Preferably the corrugations and/or the ribs of the metal roof sheets define channels for airflow within the roof space in heat exchange relationship with the metal of the roof section.

Preferably the roof assembly includes a chamber that includes one or more than one inlet for airflow from the roof space and the above described airflow opening or openings for airflow from the roof space.

In a situation in which the roof is an inclined roof, preferably the chamber is located at or proximate an upper end of the inclined roof section.

The inclined roof section may be part of any suitable roof.

For example, the inclined roof section may be part of an A-frame roof that includes a ridge cap and roof sections extending outwardly and downwardly from opposite sides of the ridge cap.

Specifically, the inclined roof section may be a part or whole of one or both A-frame roof sections.

Preferably the ridge cap defines a channel for airflow within the roof space.

With this arrangement, preferably the channels that are defined by the corrugations and/or the ribs of the metal sheets and tiles open into the ridge cap channel so that air can flow along the corrugations and/or the ribs to the ridge cap channel and thereafter along the ridge cap channel to the opening or openings.

With this arrangement, preferably the opening chamber is positioned in a section of the ridge that separates two sections of the ridge cap.

In addition, the present invention provides a building, such as a domestic house, a factory, a shopping center, and a school, that includes the above-described integrated heating and cooling system.

BRIEF DESCRIPTION OF THE DRAWING FIGURES

The present invention is described further by way of example with reference to the accompanying drawings of which:

FIG. 3 is a vertical section along the line 2-2 of FIG. 1;

Figure 2:
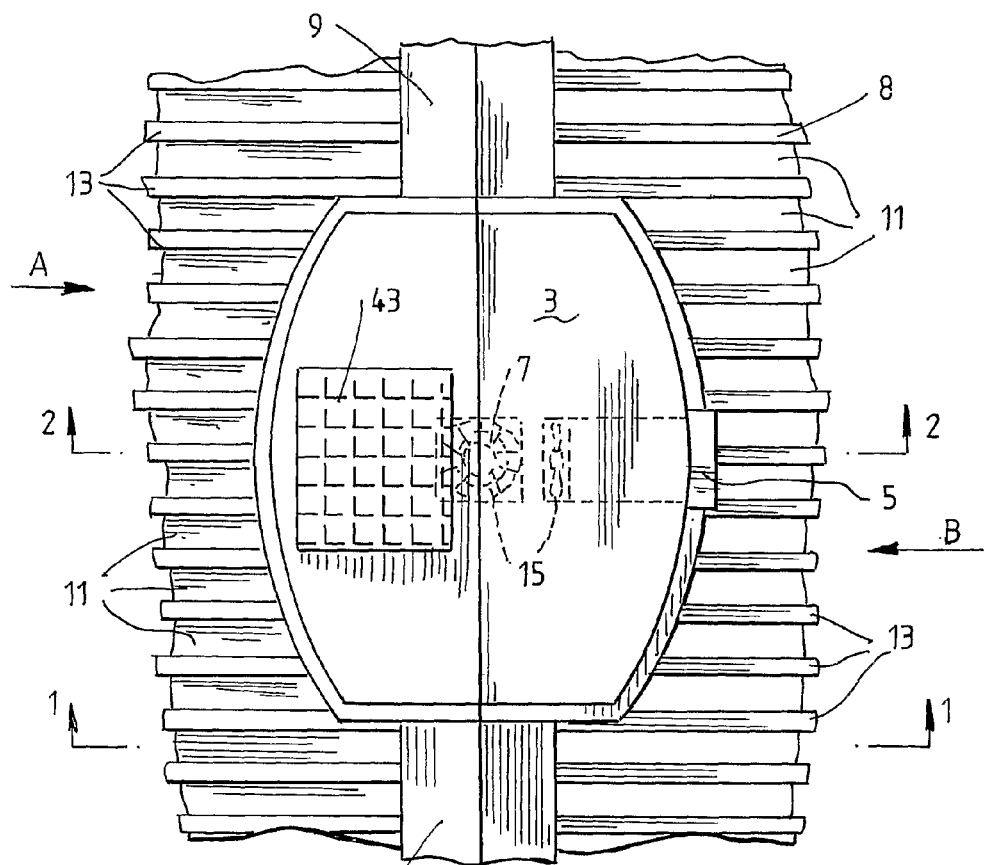
FIG. 2 is a top plan view of part of a roof assembly of a soar-based heating and cooling system that forms part of the embodiment of the heating and cooling system shown in part in FIG. 1 and, in particular illustrates an airflow chamber and airflow openings of the roof assembly.
Figure 8:
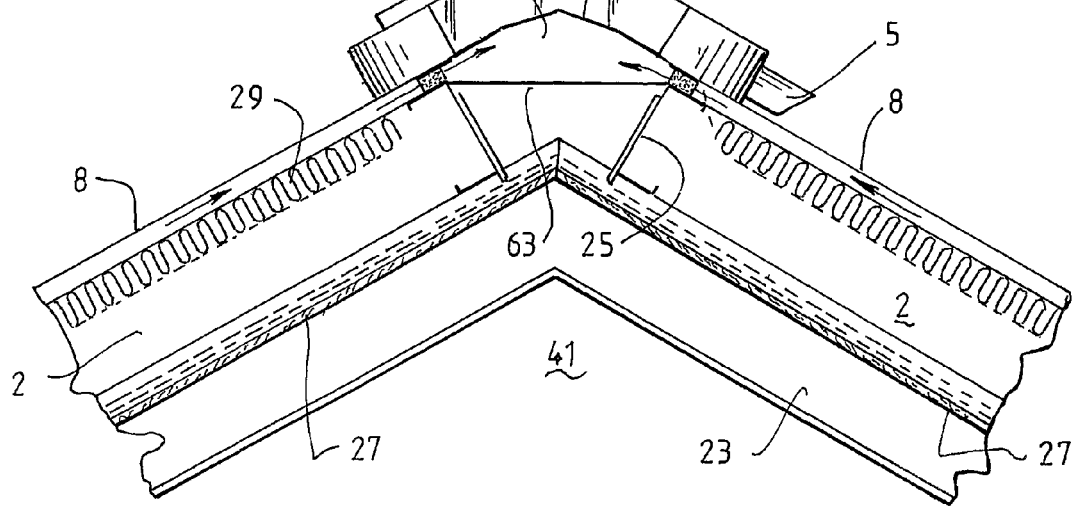
Figure 4:
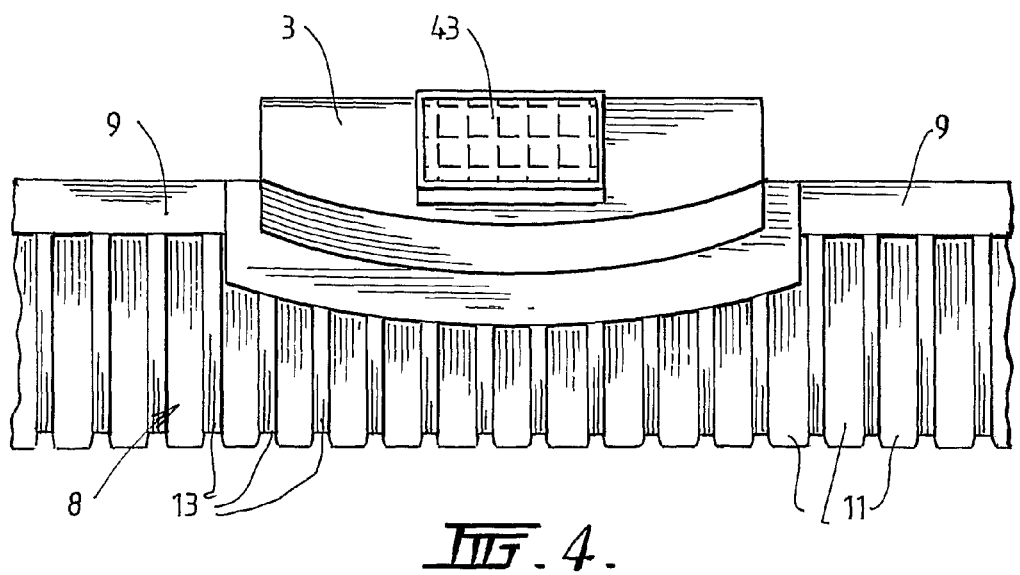
FIG. 4 is a side elevation of the roof assembly as shown in FIG. 2 in the direction of the arrow A in FIG. 2.
Figure 5:
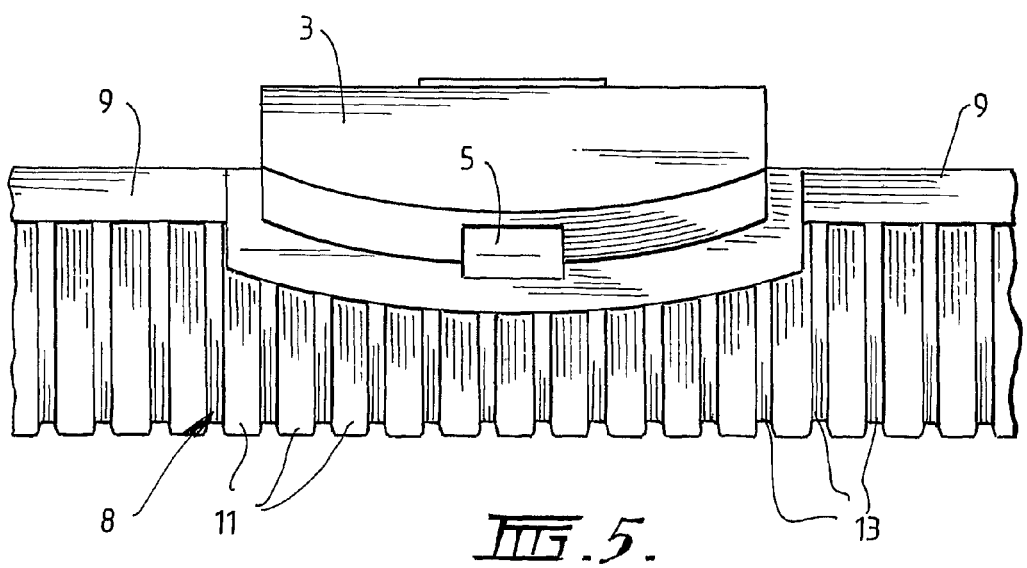
FIG. 5 is a side elevation of the roof assembly as shown in FIG. 2 in the direction of the arrow B in FIG. 1.
Figure 6:
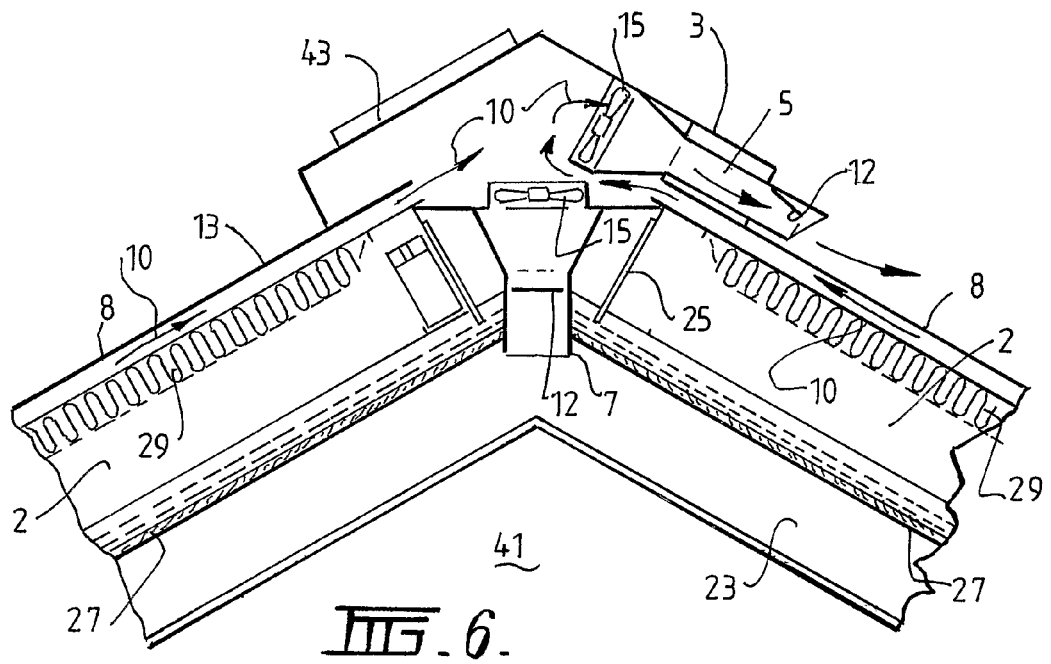
Figure 7:
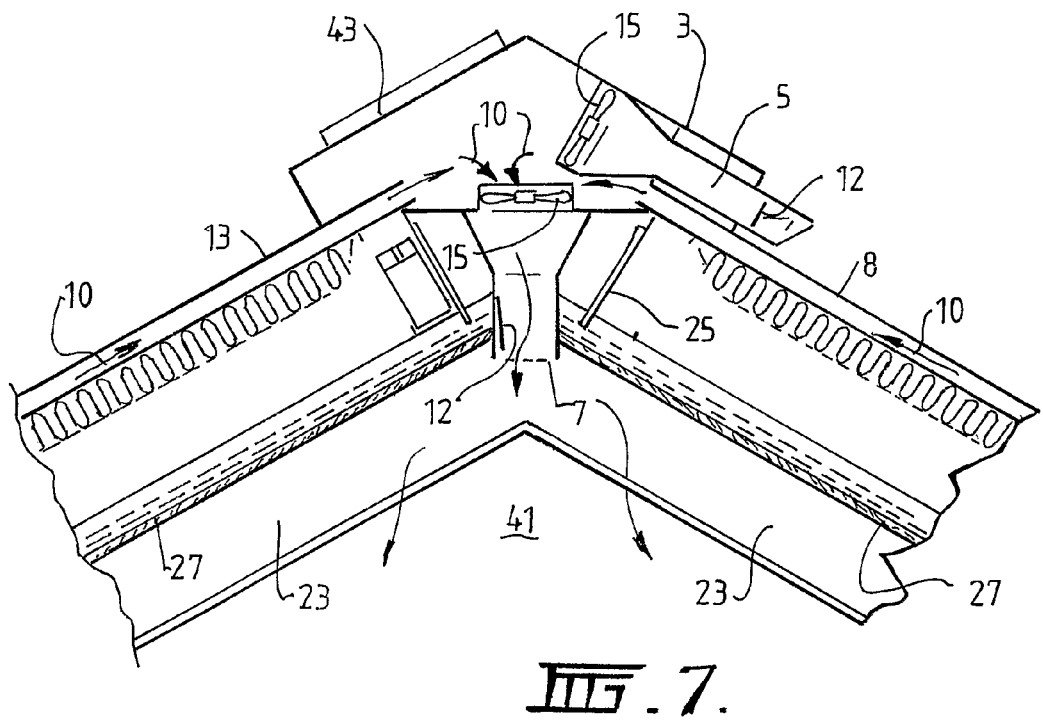

FIG. 6 is the vertical section shown in FIG. 3 with a series of arrows that illustrate the directions of airflow in the roof assembly in "summer" conditions in which the air temperature within the roof space in heat exchange relationship with the roof shown in the Figure is higher than the temperature inside the building; and FIG. 7 is the vertical section shown in FIG. 3 with a series of arrows that illustrate the directions of airflow in the roof assembly in "winter" conditions when the air temperature within the roof space in heat exchange relationship with the roof shown in the Figure is higher than the temperature inside the building; and FIG. 8 is a section along the line 1-1 of FIG. 2.

DETAILED DESCRIPTION

Figure 1:
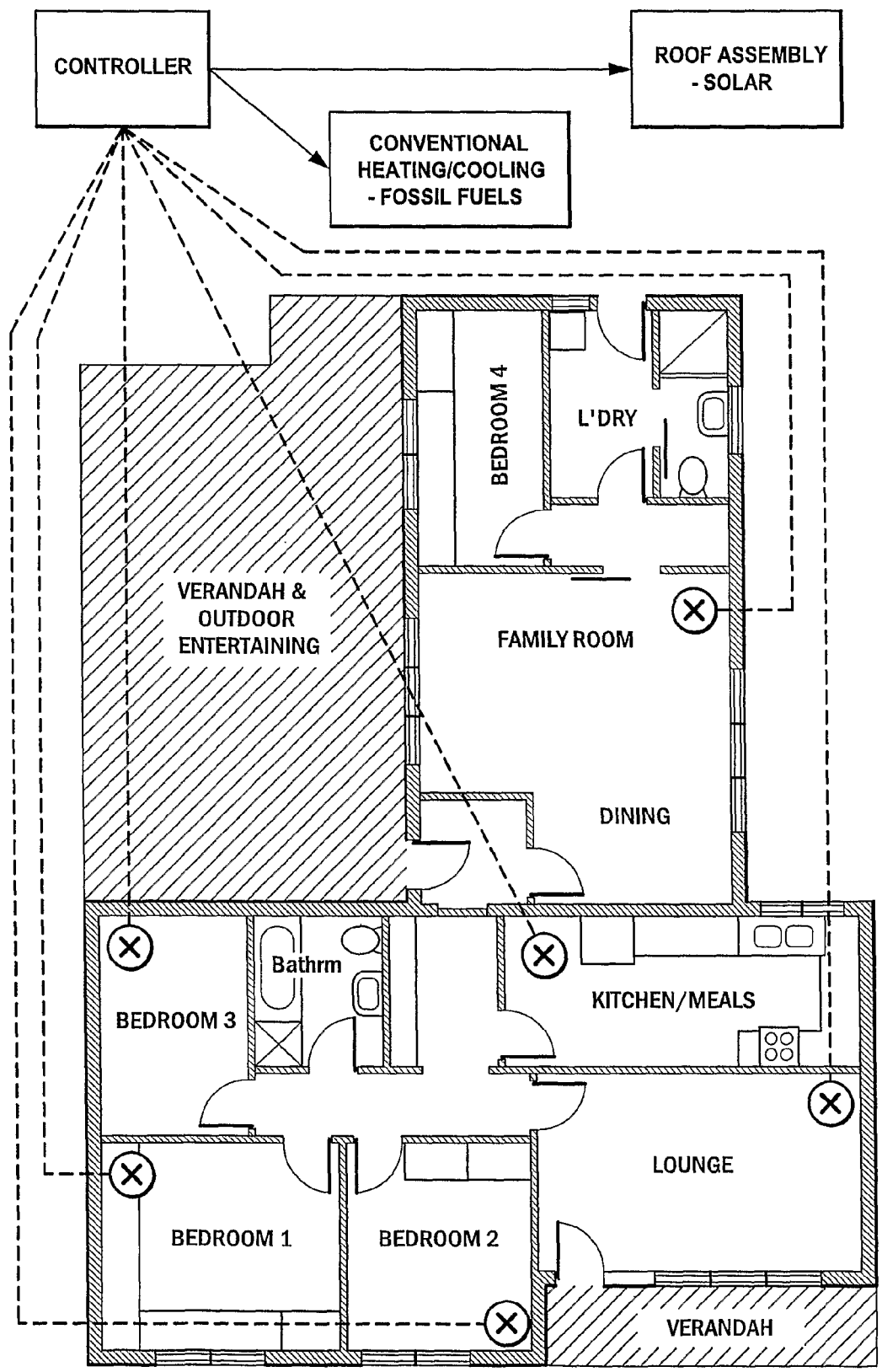
FIG. 1 is a typical floor plan for a domestic home that includes a part of an embodiment of a heating and cooling system in accordance with the present invention.

The floor plan shown in FIG. 1 is a typical floor plan for a domestic house and has a living space that includes a series of bedrooms, bathrooms, and general family rooms (including a kitchen).

The heating and cooling system illustrated in the drawings includes:
   (a) a solar-based heating and cooling system (FIG. 1);
   (b) a heating and cooling system that relies directly or indirectly on fossil fuels that are conventionally used in buildings (FIG. 1), such as a gas-fired ducted heating system and an electricity-powered ducted evaporative air conditioner,
   (c) a controller (FIG. 1) that can be pre-programmed by an operator as required and firstly operates the solar-based heating and cooling system to heat and/or cool the living space and, if required, thereafter operates the fossil fuel-based heating and cooling system to heat and/or cool the living space, to achieve and/or to maintain the temperature at a desired temperature in the living space or at a desired series of temperatures in different rooms in the living space;
   (d) a plurality of temperature sensors identified by the letter "X" in FIG. 1 in the living space, externally of the building (to measure ambient temperature), and in the solar-based heating and cooling system that monitor temperatures in the these areas and the system and are operatively connected to the controller (indicated by the dashed lines in FIG. 1);
   (e) a re-chargeable battery that is a power source for the heating and cooling system.

The controller includes a program that is responsive to measured temperature data and, more particularly to temperature differences between measured temperature data and pre-selected desired temperatures for rooms in the living space, and is designed to operate the solar-based heating and cooling system and (if required) the fossil fuel-based heating and cooling system to achieve and/or to maintain desired temperatures in the rooms of the living space.

In use, an operator enters a desired temperature for the living space (or a series of desired temperatures for different rooms in the living space) and other programmable information such as start/stop times and fan speeds into a program of the controller and actuates the heating and cooling system. In accordance with the controller program, the temperature sensors in the living space input data into the controller on a continuous or periodic basis and the controller program processes the data and determines adjustments to current operating conditions of the heating and cooling system that are required to achieve and/or maintain the desired room temperature. Where temperature adjustment is required, the controller program first operates the solar-based heating and cooling system as required to achieve the necessary temperature adjustment. If the necessary temperature adjustment can not be achieved with the solar-based heating and cooling system, the controller then operates the fossil fuel-based heating and cooling system as required to achieve the necessary adjustment. Operation of the heating and cooling systems includes, by way of example, commencing or stopping operation of the systems or increasing or decreasing the rate of supply of warm or cool air via the systems.

In one particular embodiment of the present invention, the controller is programmed with the following functions.
   Controlling the flow of warm and cool air from solar-based heating and cooling system into the living space to achieve or maintain the desired temperature.
   Controlling any supplemental heating and cooling required via fossil fuel heating and cooling system.
   Ensuring that the solar-based heating and cooling system has priority of operation over the fossil fuel heating and cooling system.
   Providing a programmable clock (for example a 7 day clock) to allow an operator to set times and temperatures for each day in a programmed period.
   Controlling the charging of the battery.
   Calculating and displaying the calculated amount of fossil fuel derived energy saved by use of the solar-based heating and cooling system.

In one embodiment the controller is programmed so that the fossil fuel heating and cooling system can only commence operation if the monitored temperature varies by at least 2° C. from the desired temperature. This feature means that small temperature variations will not result in continual on-off operation of the fossil fuel heating and cooling system. In this context, it is noted that the present invention is not limited to the selection of a 2° C. variation and any suitable temperature difference may be selected depending on the circumstances.

The solar-based heating and cooling system is the system described and claimed in International application PCT/AU2006/000146. The system is based on a roof assembly that forms part of a building.

With reference to FIGS. 2-8, which are taken from the International application, the roof assembly includes:
   (a) a roof that is a basic A-frame having a ridge cap 9 and a pair of roof sections 8 that extend outwardly and downwardly from opposite sides of the ridge cap 9 and are supported on an assembly of purlins 23 and battens 25;
   (b) a roof space 2 in heat exchange relationship with the roof sections 8; and
   (c) a chamber 3 that is positioned on the ridge of the roof and, in effect, divides the ridge cap 9 into two sections that extend from opposite ends of the chamber 3, and has (i) inlets (some of which are identified by the numeral 71 in FIGS. 5 and 6) for airflow from the roof space 2 into the chamber 3, (ii) an opening 5 for airflow from the chamber 3 to the outside of the building and vice versa, (iii) a baffle 12 that can be selectively actuated to open or close the opening 5, (iv) an opening 7 for airflow from the chamber 3 to a living space 41 of the building or vice versa, and (v) a baffle 12 that can be selectively actuated to open or close the opening 7.

The roof sections 8 are made from metal sheets that have been roll-formed from painted or unpainted steel strip into profiles that have flat pans 11 separated by open parallel ribs 13 that extend from the pans 11 along the lengths of the sheets. The metal sheets are arranged in side by side overlapping relationship with the ribs 13 extending up the inclined surfaces of the roof sections 8. It is noted that the roof sections 8 may be made from other roofing materials, such as terra cotta tiles.

The ribs 13 of the metal sheets of the inclined roof sections 8 define channels for airflow in the roof space 2 in heat exchange relationship with the metal of the metal sheets.

As is indicated above, the ridge cap 9 has two sections that extend from opposite ends of the opening chamber 3. As can best be seen in FIG. 7, the sections of the ridge cap 9 define channels 61 for airflow from the roof space 2 along the ridge cap 9 towards the inner ends of the ridge cap sections and into the chamber 3.

The airflow into the channels 61 is via the airflow channels defined by the ribs 13 in the roof sections 8.

The outer ends (not shown) of the ridge cap 9 are closed to prevent airflow from these ends. In addition, the ridge cap 9 includes a metal sheet 63 (FIG. 7) that defines a lower wall of the channel 61 and thereby further seals the channels 61. The metal sheet 63 is positioned to extend between upper ends of the metal roof sheets. In addition, the roof includes closed polyurethane strips and silicone sealer to close openings defined by the upper ends of the metal roof sheets and edges of the ridge cap 9 that, otherwise, would allow airflow outwardly from the channels 61.

As can best be seen in FIGS. 6 and 7, the metal sheets of the inclined roof sections 8 that are on opposite sides of the chamber 3 are arranged so that the upper ends of the ribs 13 of these metal sheets open into inlets 71 in the sides of the chamber 3. Thus, these ribs 13 define channels for airflow from the roof space 2 directly into the chamber 3.

The roof also includes a plasterboard ceiling 27 that defines a lower wall of the roof space 2.

The roof also includes at least one layer of insulation 29 positioned against the metal roof sheets. The insulation contributes to forming airflow channels in heat exchange relationship with the metal sheets of the roof.

As is described above, the ribs 13 of the metal roof sheets and the ridge cap 9 define a series of channels for airflow within the roof space 2. The arrangement is such that air can flow upwardly along the channels defined by the ribs 13 (a) directly into the chamber 3 or (b) into the channels 61 defined by the ridge cap sections and along the ridge cap channels 61 into the chamber 3 and the openings 5, 7 of the chamber 3.

The roof assembly also includes two fans 15 that are operable to cause airflow within the roof assembly.

The fans 15 are powered via the above-mentioned battery (which also powers the controller). Typically, the battery is re-chargeable via a solar cell array 43. It is noted that the battery may be re-chargeable via any other suitable power source such as mains power.

As can best be seen in FIG. 6, during "summer" conditions, with the baffles 12 in the opening 5 in open position and the baffle 12 in the opening 7 in a closed position, the fans 15 are operated to cause airflow of hot air from the roof space 2 into the chamber 3 and from the chamber through the opening 5 to outside the building.

In particular, the fans 15 cause air to move through the channels defined by the ribs 13 and the moving air is heated via heat exchange with the metal roof sheets and the heated air flows into the chamber 3 and from the chamber through the opening 5. Thus, the airflow moving through the roof space 2 removes heat from the building that otherwise ultimately would heat the living space 41 of the building. More specifically, the air space 2, and particularly moving air passing through the roof space 2, increases the thermal resistance of the roof assembly.

As can best be seen in FIG. 7, during "winter" conditions, with the baffle 12 in the opening 5 in a closed position and the baffle 12 in the opening 7 in an open position, the fans 15 are operated to cause airflow from the roof space 2 to the chamber 3 and from the chamber through the opening 7 into the living space 41.

In particular, the fans 15 cause air to move through the channels defined by the ribs 13 and the moving air is heated via heat exchange with the metal roof sheets and the heated air flows via the chamber 3 and the opening 7 into the living space 41 and heats the space.

In addition, whilst not shown in the Figures, during "nocturnal" conditions, i.e. where the outside temperature and the roof space temperature are lower than the inside temperature and the inside temperature is higher than the desired temperature, with the baffle 12 in the opening 5 in a closed position and the baffle 12 in the opening 7 in an open position, the fans 15 are operated to cause airflow from the roof space 2 to the chamber 3 and from the chamber through the opening 7 into the living space 41.

Experimental work carried out by the applicant found that (a) during "summer" conditions the roof assembly cooled the building during day time by extracting heat from the roof space 2, (b) during "winter" conditions the roof space 2 heated the building during day time by supplying heated air to the building from the roof space 2, and (c) during "nocturnal" conditions the roof space 2 cooled the building, particularly during the cooler early morning, by supplying air that had been cooled by heat exchange with the metal roof sections that were below the inside temperature at that time and where the inside temperatures were above the desired temperature.

The scenario covered by item (c) is particularly relevant where there are substantial temperature differences between night and say temperatures, such is the case in areas of central and north Australia and the Middle East.

The above-described roof assembly is a straightforward construction that makes use of standard building elements, such as metal roof sheets.

In addition, the above-described roof assembly can be constructed without difficulty by modifying an existing roof assembly.

Many modifications may be made to the embodiment of the heating and cooling system of the present invention described above without departing from the spirit and scope of the invention.

By way of example, whilst the embodiment includes a roof assembly in the form of an A-frame roof with a ridge cap and roof sections 8 that extend outwardly and downwardly from opposite sides of the ridge, the present invention is not so limited and extends to any suitable roof. By way of example, another suitable roof is a metal sheet roof that includes highlight windows.

By way of further example, whilst the embodiment includes a roof assembly that has a single chamber 3, the present invention is not so limited and extends to arrangements that have more than one chamber 3.

By way of further example, whilst the embodiment includes a roof assembly that has roof sections 8 that are made from metal sheets that have been roll-formed from painted or unpainted steel strip, the present invention is not so limited and extends to arrangements that have roof sections 8 made from any suitable materials.

By way of further example, whilst the embodiment includes a roof assembly that has roof sections 8 that are made from metal sheets, the present invention is not so limited and extends to roof sections made from metal tiles that have been formed, for example by being pressed, into a tile shape and include corrugations and/or ribs as part of the tile shape.

By way of further example, whilst the embodiment includes a roof assembly that has inclined roof sections 8, the present invention is not so limited and extends to flat roofs.

By way of further example, whilst the embodiment includes a combination of a solar-based heating and cooling system and a fossil fuel heating and cooling system, the present invention is not so limited and extends to the use of heating and cooling systems that are otherwise powered, for example by other renewable energy sources.

By way of further example, whilst the embodiment includes a re-chargeable battery that is a power source for the heating and cooling system, the present invention is not so limited and extends to arrangements in which there is a direct mains power supply to the heating and cooling system, such as to the controller and the fans 15.

The invention claimed is:

1. An integrated heating and cooling system for a living space of a building that can achieve and/or maintain a desired temperature in the living space, comprising; (a) a solar-based heating and cooling system that includes a roof assembly that includes a roof, a roof space in heat exchange relationship with at least a section of the roof, the roof space being isolated from a living space, and a chamber that includes (i) one or more than one inlet for airflow from the roof space into the chamber, (ii) one or more than one first opening having a flow control apparatus for airflow from the roof space via the chamber to outside the building altogether, the flow control apparatus allowing air to flow from the chamber to outside the building to cool the building when an outside temperature outside the building is higher than a desired temperature in the living space, and (iii) one or more than one second opening for airflow having a second flow control apparatus for airflow from the roof space via the chamber to a living space of the building, the second flow control apparatus allowing air to flow from the chamber to a living space to heat the living space when the outside temperature is lower than the desired temperature in the living space, and to cool the living space when the outside temperature and/or a roof space temperature is lower than an inside temperature in the living space, and the inside temperature is higher than the desired temperature, (b) a fossil fuel-based heating and cooling system that relies directly or indirectly on fossil fuels, and (c) a controller that monitors temperatures and, subject to monitored temperatures, firstly operates the solar-based heating and cooling system to heat and/or cool the living space and, when heating and cooling requirement cannot be fully met by the solar based heating and cooling system, thereafter operates the fossil fuel-based heating and cooling system to heat and/or cool the living space, to achieve and/or to maintain the temperature in the living space at the desired temperature, and (d) a plurality of temperature sensors that monitor temperatures in the living space, externally of the building, and in the solar-based heating and cooling system, wherein the sensors input data into a program of the controller on a continuous or periodic basis and the program processes the data and operates the solar-based heating and cooling system and, when heating and cooling requirement cannot be fully met by the solar based heating and cooling system, the fossil fuel-based heating and cooling system to achieve and/or to maintain the desired temperature in the living space.

2. The system defined in claim 1 wherein the controller operates the fossil fuel-based heating and cooling system to heat and/or to cool the living space if the monitored temperatures vary from the desired temperature by a predetermined temperature variation.

3. The system defined in claim 2 wherein the predetermined temperature variation is 2° C.

4. The system defined in claim 1 wherein the living space includes a plurality of rooms with different desired temperatures for the rooms.

5. The system defined in claim 1 wherein the roof assembly includes a means for causing airflow within the roof space in heat exchange relationship with the roof to the one or more than one first opening or to the one or more than one second opening.

6. The system defined in claim 1 further including at least one solar powered fan for causing airflow within the roof space to the one or more than one first opening or to the one or more than one second opening.

7. The system defined in claim 6 wherein the airflow is derived from air within the roof space and/or from air from exterior of the building that flows into the roof space.

8. The system defined in claim 1 wherein the roof section comprises an inclined roof section and is made from metal roof sheets that include profiles that include corrugations or include flat pans separated by ribs arranged in side by side, relationship with the corrugations and/or the ribs extending up an inclined surface of the roof section.

9. The system defined in claim 8 wherein the corrugations and/or the ribs of the metal roof sheets define channels for airflow within the roof space in heat exchange relationship with metal of the roof section.

10. A building that includes the system defined in claim 1.

11. The system defined in claim 7, wherein the airflow is derived from air that flows into the roof space from a gutter end of the roof.

12. The system defined in claim 8, wherein the metal roof sheets are arranged in side by side, overlapping relationship.

13. The system defined in claim 1, wherein the chamber is positioned on the roof.

14. The system defined in claim 13, wherein the chamber is positioned on a ridge of the roof.

15. The system defined in claim 1, wherein the one or more than one second opening directs airflow from the roof space via the chamber directly into the living space.

16. The system defined in claim 1, wherein the controller ensures that the solar-based heating and cooling system has priority of operation over the fossil fuel-based heating and cooling system.

17. The system defined in claim 1, wherein the controller calculates and displays a calculated amount of fossil fuel derived energy saved by use of the solar-based heating and cooling system.

18. The system defined in claim 9, further including at least one layer of insulation positioned against the metal roof sheets and contributing to formation of the channels for airflow within the roof space.

* * * * *